May 9, 1967 W. ODENDAHL 3,318,321
MINIMUM AMOUNT CONTROL FOR CENTRIFUGAL TYPE BOILER FEED PUMPS
Filed Aug. 30, 1965 3 Sheets-Sheet 1

Inventor:
Wilhelm Odendahl

May 9, 1967 W. ODENDAHL 3,318,321
MINIMUM AMOUNT CONTROL FOR CENTRIFUGAL TYPE BOILER FEED PUMPS
Filed Aug. 30, 1965 3 Sheets-Sheet 2
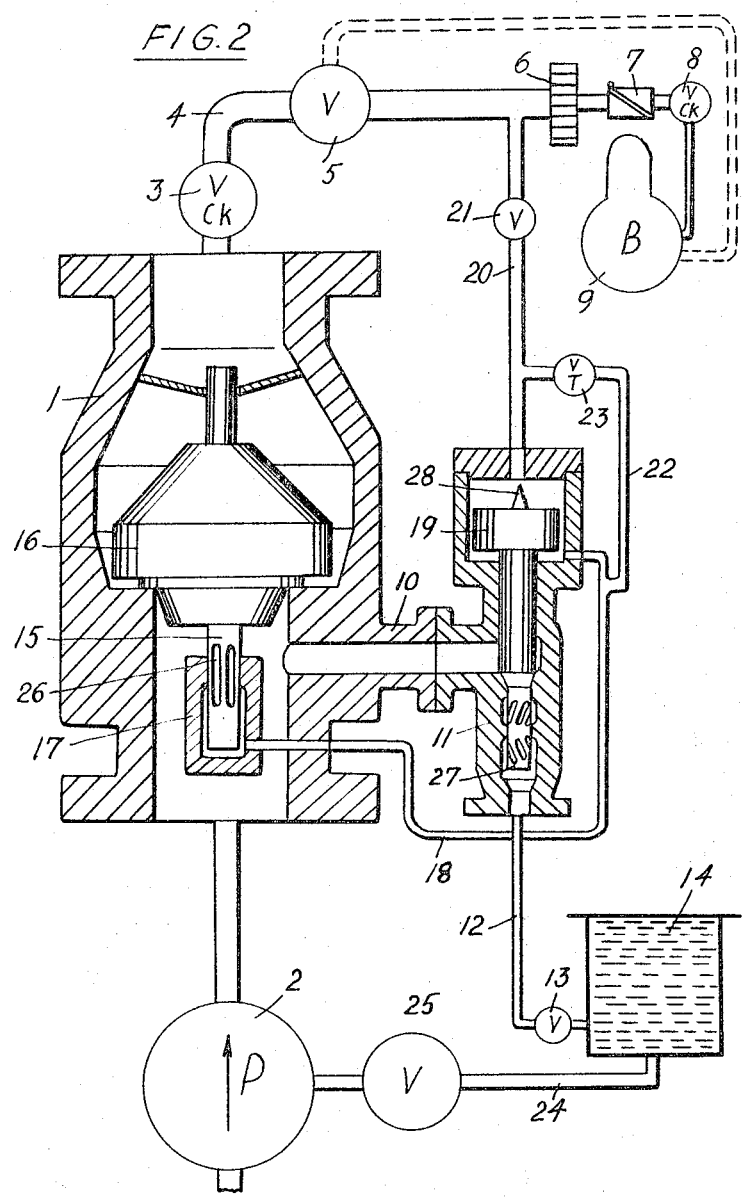
Inventor:
Wilhelm Odendahl United States Patent Office 3,318,321
Patented May 9, 1967

3,318,321
MINIMUM AMOUNT CONTROL FOR CENTRIFUGAL TYPE BOILER FEED PUMPS
Wilhelm Odendahl, 46 Homerichstrasse, Gummersbach-Steinenbruck, Germany
Filed Aug. 30, 1965, Ser. No. 483,553
Claims priority, application Germany, Aug. 29, 1964, O 10,348
4 Claims. (Cl. 137—117)

This invention relates to a system for protecting centrifugal pumps, particularly boiler feed pumps, during low-load and no-load operation which comprises a hydraulically operated minimum amount valve incorporated in a by-pass pipe and a flow operated valve incorporated in the delivery pipe of a centrifugal pump and having a positively controlled by-pass communicating with one side of a control cylinder of the minimum amount valve.

Systems of this type are known. In part of the known systems the control of the minimum amount valve is effected in that the by-pass of the flow controlled valve is positively opened when passing to low-load and no-load operation, whereby the control cylinder of the minimum amount valve is acted upon by the final pressure of the centrifugal pump so that the minimum amount valve is opened against the pressure of a spring.

In another known system to the one side of the control cylinder of the minimum amount valve the pressure of a low stage of the centrifugal pump is admitted, whereas to the other side thereof the final pressure of the centrifugal pump is admitted, the by-pass being preferably constructed as a mushroom valve which exchanges the pressure connections of the control cylinder on reversal.

In another known system the servo piston of the minimum amount valve is acted upon in the closing direction by the pressure prevailing upstream of the flow controlled valve and in the opening direction by the pressure prevailing on the downstream side thereof, the control action taking place automatically when the opening power becomes predominant.

The invention starts from these known systems and consists in that the other side of the control cylinder is acted upon by the pressure derived from downstream of the feed regulating valve or the pressure in the boiler.

The advantage of some of the known systems where the indolence stream flows to the consuming device such as a boiler is retained by the invention. The disadvantage of the known systems that the differential pressure for operating the servo piston is relatively low is eliminated by the invention in that the control stream is returned only downstream of the feed regulating valve. Therefore only a relatively small piston area is required for the servo piston. This is particularly important with high operating pressures since the cylinder wall thickness increases with the increasing piston diameter and thus the overall installation would become too expensive, heavy and bulky.

The differential pressure available at the by-pass when adopting the invention has a head which with the lower stem being constructed as a piston control valve is adapted to hydraulically generate a closing power for the flow controlled valve which keeps the natural frequency of the valve cone over the total lift range above 5 c.p.s. As is known, resonance phenomena are avoided in this way. In a known valve, to achieve this end the closing power is provided by a spring which however is unreliable since subject to breakage. Contrary thereto, the hydraulic closing power according to the invention is always available.

The characteristic of the delivery pressure of the centrifugal pump is stabilized by a known valve the valve cone of which has two control tapers of strongly different diameters, thereby to avoid mass vibration. The power for throttling the delivery stream is generated, in this case, by a powerful closing spring. This spring is subject to fatigue after some time so that the throttling required for the stabilization will no longer be attained to the full extent. Consequently, mass vibrations may occur which cause the valve cone to swing so that the closing spring is overstressed and will break. The stabilization of the delivery pressure characteristic of a centrifugal pump in the known manner can also be achieved by the valve according to the invention. In this case it is of advantage that the hydraulic closing power decreases with the differential pressure between the pumping head characteristic of the centrifugal pump and the pressure progress on the downstream side of the feed regulating valve in such a manner that it is not necessary to construct the flow controlled valve cone as a double-cone.

Various embodiments of the invention will now be described by way of example and with reference to the accompanying drawings, in which:

FIG. 2 is a partly sectional schematic view of a preferred embodiment of a minimum amount control system according to the invention;

Figure 1:
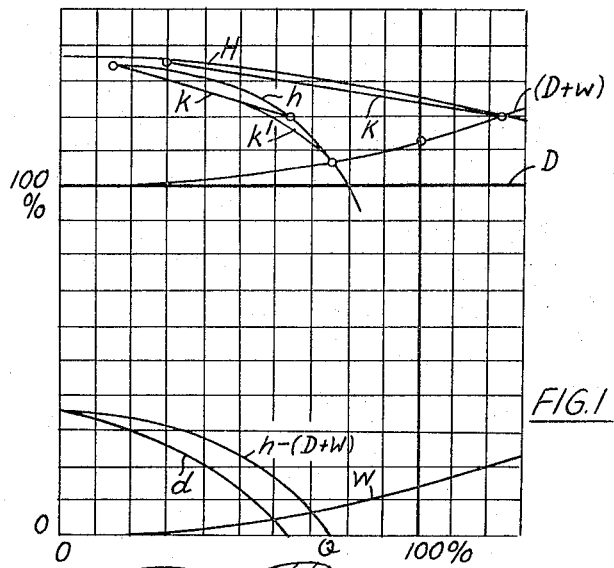
FIG. 1 is a diagram showing the pumping head and resistance characteristics of a boiler plant.

Referring to the diagram of FIG. 1, the feed quantity referenced Q is given on the abscissa af the diagram in percent of the maximum continuous delivery and the ordinate is graduated in percent of the permissible pressure of the boiler D. A curve $h$ is plotted to indicate the manometric pumping head of an individually operating feed pump, whereas the characteristic curve of the total delivery of the two feed pumps of the plant is referenced H. The pipe resistances on the downstream side of the feed regulating valve are indicated by a curve $w$. The resistance on the upstream side of the feed regulating valve shall be neglected. With D and $w$ the curve of the required pumping head $(D+w)$ is obtained which intersects H at 125% of the maximum continuous delivery. If only one pump is operated $(D+w)$ will be intersected by the curve $h$ at about 75% of the maximum continuous delivery. In single-pump operation, the pressure difference between the delivery connection of the feed pump and the feed regulating valve is $h-(D+w)$ and in full operation as compared with a single pump it will correspond to a curve $d$ which is obtained by plotting the pressure difference $H-(D+w)$ above the bisected Q's. Such pressure differences regularly disappear where the resistance curve and the characteristics of the manometric pressure intersect. This has the advantage that with maximum delivery of the pumps the by-pass is not at all subjected to jet wear.

FIG. 2 shows a preferred embodiment of a minimum delivery control system which comprises a check valve 1 which is vertically mounted on the delivery connection of a feed pump 2 and communicates with a boiler 9 through a shutoff valve 3, a feed pipe 4, a feed regulating valve 5, a high-pressure preheater 6, a swing check valve 7 and a shutoff valve 8. A lateral connection 10 of the check valve 1 communicates with a feed water reservoir 14 through a minimum amount valve 11 and a by-pass pipe 12 including a check valve 13. The check valve 1 comprises a valve cone 16 having a lower stem 15 which is provided with control ports 26 and designed as a piston slide for a by-pass control valve 17. A control pipe 18 leads from the by-pass control valve 17 into a cylinder space of the minimum amount valve 11 and opens below a servo piston 19 movable in this cylinder space. The cylinder space above the servo piston 19 communicates with the downstream side of the feed regulating valve 5 through a control pipe 20 incorporating a check valve 21. The control pipes 18 and 20 may communicate with a throttle valve 23 through a by-pass conduit 22.

The feed pump 2 is fed with hot feed water from the feed water reservoir 14 through a feed pipe 24 and a suction slide 25. When the feed regulating valve 5 is closed, the valve cone 16 is in its closing position. In this position, the control ports 26 in the lower stem 15 permit an increased control stream to flow off through the by-pass control valve 17 and to arrive at the downstream side of the feed regulating valve 5 through the control pipe 18 and the ring gap seal of the servo piston 19 and through the control pipe 20. Consequently, a pressure builds up on the lower side of the servo piston 19 which opens the minimum delivery valve 11. The minimum amount can flow off then into the feed water reservoir 14 through the circulation pipe 12 so that the feed pump 2 is protected from low-load damage. As soon as the boiler 9 needs an amount of water larger than the minimum amount and the control has correspondingly wide opened the feed regulating valve 5 and the pump has resumed delivery through the feed pipe 4, the valve cone 16 will be lifted by the flow so that the control ports 26 in the lower shaft 15 are shut. The bypass control valve 17 then only permits the passage of a quite negligible leakage stream. Since the ring gap seal of the by-pass control valve 17 is considerably smaller than that of the servo piston 19, the leakage stream is not capable of building up an appreciable pressure below the servo piston 19. Due to the internal pressure of the minimum amount valve 11 acting on the cross-sectional area of a valve stem 27 the valve moves into its closing position and shuts off the minimum amount stream. It is often desired that the circulating amount be continuously controlled in dependence on the feed amount in such a manner that the sum of the two amounts remains constant in the low-load range. This can be attained by the invention in that the control stream is additionally throttled, in a manner known per se, by a needle 28 in dependence on the stroke of the minimum amount valve 11. Thus the constant closing force of the valve stem 27 and the stroke-dependent opening force of the servo piston 19 are balanced at a predetermined stroke. The valve stem 27 will hold out in this balanced position and let escape only the amount corresponding to this opening position. The same effect can also be obtained when the needle 28 is dispensed with and instead thereof a spring is provided on the valve stem 27, the stroke-dependent power of which spring will be balanced with the power of the servo piston 19.

Figure 3:
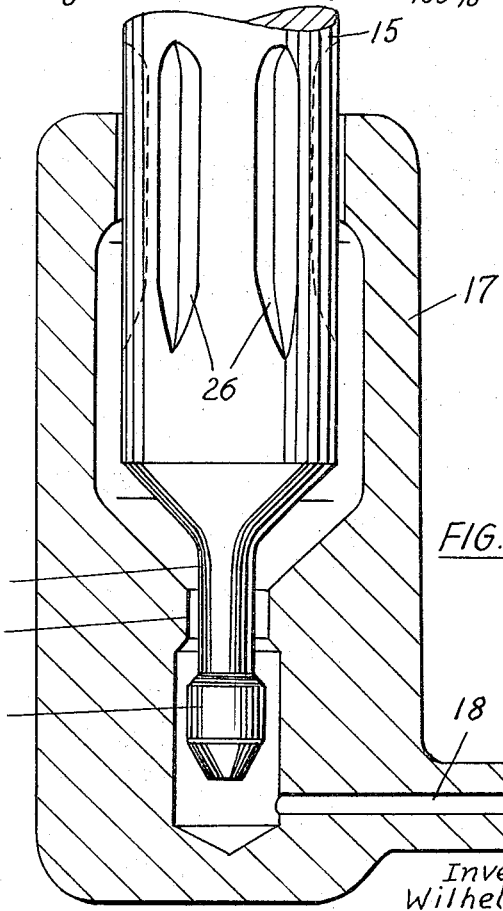
FIG. 3 is a partly sectional view, on an enlarged scale, of a particular embodiment of a by-pass control valve.

In the particular construction of the by-pass control valve 17 illustrated in FIG. 3, the lower stem 15 is additionally provided with a special throttling pin 29 having a control head 30 adapted to cooperate with a restriction 31. In the lower position of the control head 30 the control stream is permitted to flow through the control ports 26 and about the control head 30. The clear cross-sectional area of the control ports 26 is relatively large and the closing force therefore originates from the pressure gradient at the throttling pin 29. Since this pressure gradient acts only on the relatively small cross-sectional area of the throttling pin 29, the closing force is very insignificant in this position. As soon as the control head 30, upon a predetermined stroke, cooperates with the restriction 31 to throttle the control stream, the minimum amount valve 11 closes. With the stroke continuing, the control slots 26 are gradually closed and take over the throttling of the control stream because the control head 30, at the same time, leaves the restriction upwardly. The resulting pressure gradient acts on the cross-sectional area of the lower stem 15 and generates a high closing power for the valve cone 16 which thereby is caused to throttle the main stream in a correspondingly efficient manner. Since the closing power diminishes, according to the shape of the curve $d$ (FIG. 1), with increasing flow the main stream will be throttled in such a manner as to cause the curve $h$ of the manometric pumping head into a pressure curve $k$ (FIG. 1). In the partial-load range, the pressure curve $k$ is steeper than the characteristic $h$ of the manometric pumping head so that the feed regulation and the parallel operation of the pumps are facilitated. The invention thus has the advantage over the known correction of the characteristic curve that there will be practically no throttle losses at the intersections of the pumping head characteristics and the curve $$(D+w)$$

If there were such losses under the FIG. 1 conditions, the pumps would no longer meet the requirements, for they could not produce the manometric pumping head required at 125% of the maximum continuous delivery.

Figure 4:
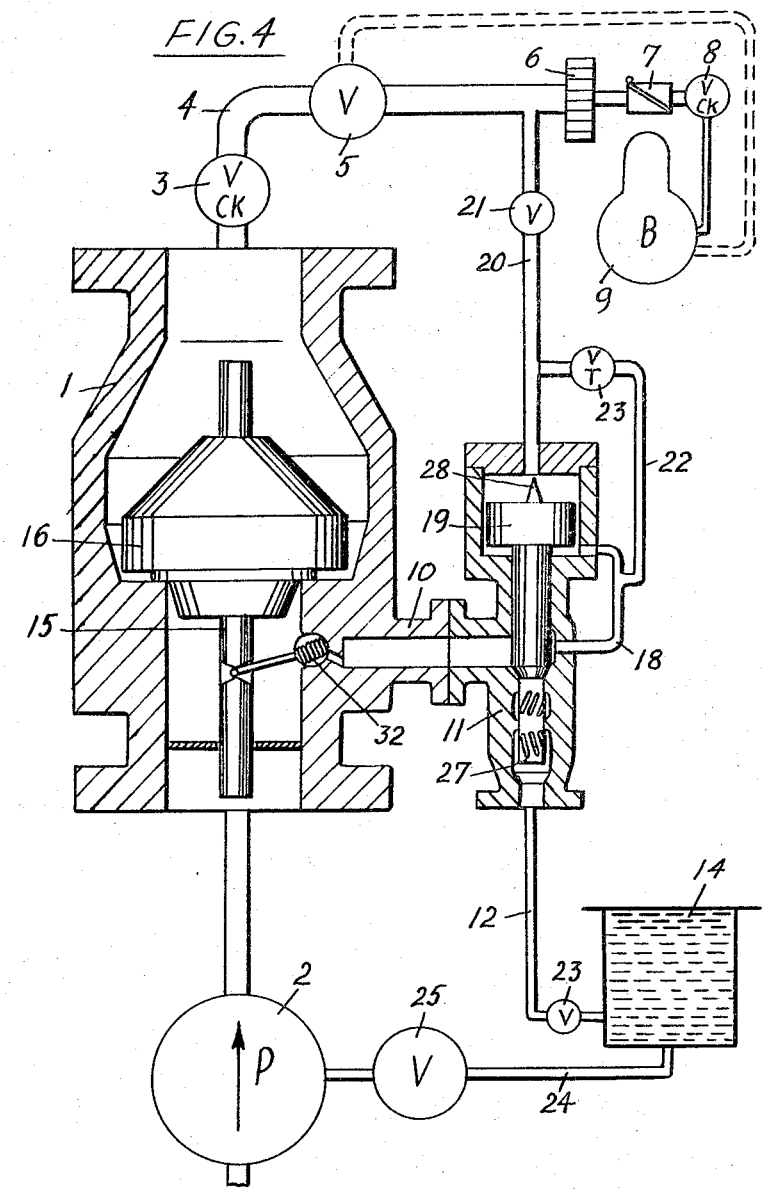
FIG. 4 is a view similar to FIG. 1 and showing another embodiment of the invention.

It is also possible to subsequently incorporate the subject matter of the invention in free running check valves which have already been in service for some time. For this purpose, the embodiment illustrated in FIG. 4 will prove expedient. In this construction, the valve cone 16 dropping into its closing position opens a free running slide 32, whereby the pump pressure is permitted to get under the servo piston 19, the upper side of which is acted upon by the pressure prevailing downstream of the feed regulating valve 5, and thus to open the minimum amount valve 11. A known system comprises a free running check valve having a pressure reducing valve connected to its side-outlet, which is loaded in the closing direction by a spring and in the opening direction by a diaphragm to which the pump pressure is applied. If in this known system the free running slide has become slightly leaky a pressure builds up below the diaphragm and causes the minimum amount valve to open against the spring action to such an extent that the amount corresponding to the leakiness of the free running slide is permitted to flow off. The minimum amount valve thus becomes leaky together with the free running slide. This disadvantage is obviated by the invention, for the leakage water of the leaky free running slide will flow off through the ring gap seal of the servo piston 19 without causing the minimum amount valve 11 to open.

Another combination of a free running check valve with a servo-controlled minimum amount valve has become known in which the rear of the servo piston is acted upon by the pressure of the pump stage next to the last. Since the servo piston is provided with a ring gap seal, the minimum flow valve will remain closed when the free running slide is leaky. With a leaky free running slide, however, there will result a constant loss from the water which flows back. Moreover, it is difficult to provide the pumps subsequently with a return-flow connection at the penultimate pump station.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. A system for protecting against overloading of a centrifugal boiler feed pump during low-load and no-load operation comprising: a centrifugal pump having an inlet line connected to a supply reservoir and a delivery pipe connected to a boiler, a hydraulically operated minimum amount valve incorporated in a first by-pass line leading from said delivery pipe to said supply reservoir, a flow operated valve in said delivery pipe downstream of said first by-pass line, said minimum amount valve having a control cylinder with a control piston means therein, a second valved by-pass line leading from said flow operated valve to one side of said control piston means of said minimum amount valve, a feed regulating valve in said delivery pipe between said boiler and said flow operated valve, a line connecting said delivery pipe downstream of said feed regulating valve to another side of said control piston means exposing said other side of said control piston means to boiler feed pressure.

2. The system as in claim 1, wherein the valve in said second by-pass line is in the form of a slide having means whereby one side of said slide is acted upon by pump outlet pressure and another side of said slide is acted upon by a reduced pressure to produce a substantial closing force on said flow operated valve.

3. The system as in claim 2, wherein said means is constructed as a differential slide provided with throttling areas, said areas being variable with valve lift so that the generated closing force on said flow operated valve is maximum when the valve is in its middle lift position.

4. The system as in claim 2, wherein said flow operated valve includes a cone-like portion and a stem portion projecting therefrom which stem portion forms said slide.

References Cited by the Examiner

UNITED STATES PATENTS

| | | | |
|---|---|---|---|
| 2,888,943 | 6/1959 | Hipple | 137—106 |
| 3,033,277 | 5/1962 | Cowles et al. | 137—117 X |
| 3,152,603 | 10/1964 | Zeisloft | 137—117 |
| 3,160,332 | 12/1964 | Brunson | 222—318 |
| 3,195,556 | 7/1965 | Norstrud | 137—117 |
| 3,217,732 | 11/1965 | Haugeland | 137—117 |
| 3,266,426 | 8/1966 | Brunson | 103—42 |

DONLEY J. STOCKING, *Primary Examiner.*

W. J. KRAUSS, *Assistant Examiner.*